US007002586B2

(12) United States Patent
Chiu et al.

(10) Patent No.: US 7,002,586 B2
(45) Date of Patent: Feb. 21, 2006

(54) METHOD AND APPARATUS FOR VERTEX SPLITTING IN A GRAPHICS SYSTEM

(75) Inventors: Kenneth Chiu, San Francisco, CA (US); Vernon Hu, Union City, CA (US); Michael F. Deering, Los Altos, CA (US)

(73) Assignee: Sun Microsystems, Inc., Santa Clara, CA (US)

( * ) Notice: Subject to any disclaimer, the term of this patent is extended or adjusted under 35 U.S.C. 154(b) by 68 days.

(21) Appl. No.: 10/652,192

(22) Filed: Aug. 29, 2003

(65) Prior Publication Data
US 2005/0046632 A1 Mar. 3, 2005

(51) Int. Cl.
*G06F 15/80* (2006.01)
*G06F 9/46* (2006.01)

(52) U.S. Cl. .................... 345/505; 718/104; 718/105; 718/106

(58) Field of Classification Search ............. 345/502, 345/501, 505; 718/104–106
See application file for complete search history.

(56) References Cited

U.S. PATENT DOCUMENTS

| 5,631,908 | A | * | 5/1997 | Saxe | 370/235 |
|---|---|---|---|---|---|
| 5,745,125 | A | * | 4/1998 | Deering et al. | 345/503 |
| 5,764,243 | A | * | 6/1998 | Baldwin | 345/506 |
| 5,793,371 | A | * | 8/1998 | Deering | 345/418 |
| 5,887,155 | A | * | 3/1999 | Laidig | 716/10 |
| 6,046,744 | A | * | 4/2000 | Hoppe | 345/419 |
| 6,154,223 | A | * | 11/2000 | Baldwin | 345/506 |
| 6,631,423 | B1 | * | 10/2003 | Brown et al. | 719/323 |
| 6,753,878 | B1 | * | 6/2004 | Heirich et al. | 345/629 |

OTHER PUBLICATIONS

J.L. Baer, "A Survey of Some Theoretical Aspects of Multiprocessing", Mar. 1973, Computing Surveys, vol. 5, pp. 31-80.*

"Least Recently Used", Feb. 15, 1995, Free on-line Dictionary of Computing, http://foldoc.doc.ic.ac.uk/foldoc/foldoc.cgi?least+recently+used.*

* cited by examiner

*Primary Examiner*—Kee M. Tung
*Assistant Examiner*—Joni Hsu
(74) *Attorney, Agent, or Firm*—Meyertons Hood Kivlin Kowert & Goetzel, P.C.; B. Noël Kivlin

(57) ABSTRACT

An apparatus and method for splitting vertex streams relating to graphics data into substreams, and processing the substreams in parallel. A graphics subsystem of a computer system includes a vertex splitting module, which determines whether incoming vertex streams are of a unicast, unlocked type, and thus available for splitting, and further whether graphics primitives in the vertex stream are of a type that may be split. If appropriate, the vertex splitting module then locates vertices in the vertex stream, generates substreams from the vertex stream, and transmits the substreams in a load-balanced operation to multiple graphics processors for parallel processing and outputting to an output device. If the vertex stream is too large to store in FIFO queues of the graphics processors, it is not split into substreams.

16 Claims, 6 Drawing Sheets

METHOD AND APPARATUS FOR VERTEX SPLITTING IN A GRAPHICS SYSTEM

BACKGROUND OF THE INVENTION

As computer systems include increasingly sophisticated graphics subsystems and render and display images of ever greater complexity, the files representing those images are increasing in size and the processing required to render them is more demanding.

Current high-end systems may include several video or graphics processors and accelerators sufficient to process several streams of image or video data simultaneously, rendering the streams of data in parallel and outputting the results to appropriate display systems. A challenge presented by such systems is that a given graphics data stream may be extremely large, which can result in one of the hardware accelerators operating at capacity while other accelerators in the system are underutilized.

In systems with more than one hardware accelerator, there are several modes in which a video stream (or "vertex stream", referring to the vertex data of the graphics primitives) may be sent, including as: a broadcast (the same vertex stream sent to multiple accelerators); a unicast-locked stream (a vertex stream sent to a single accelerator, set in software so that it can't be broken into multiple streams); and a unicast-unlocked stream (sent as a single vertex stream, but able to be broken into multiple streams).

It would be advantageous to provide a system wherein a graphics data stream could be distributed to multiple hardware accelerators to balance the processing load among the graphics processors, particularly for vertex streams that are sent as unicast-unlocked. However, there are a number of types of graphics primitives currently in common use in accordance with OpenGL and other approaches, including lines, triangles, polygons, triangle strips, and so on. It may be impractical to split streams of data representing some of these primitives in current systems, whereas for others an efficient approach to splitting may be arrived at. Accordingly, it would be useful to provide a system that can determine for a given graphics data stream whether splitting would be advantageous, as well as a system that actually executes the splitting and load balancing of such data streams.

SUMMARY OF THE INVENTION

An embodiment of the invention is implemented as a graphics subsystem in a computer system, where the graphics subsystem includes a vertex splitting module that splits vertex streams under the appropriate conditions.

The vertex splitting module is connected at its outputs to multiple graphics processors, each with a FIFO queue. When a vertex stream is received by the vertex splitting module, it determines from header data whether graphics primitives in the vertex stream are of a type that may be split, such as line segments or quad strips. The vertex splitting module also determines whether the vertex stream is itself of a type that may be split, such as unicast, unlocked type.

If the vertex stream is appropriate to split, then the vertex splitting module locates vertices in the vertex stream at locations to generate vertex substreams near to a predetermined size of substream, and sends these to an arbiter, which distributes them in a load-balanced fashion to the graphics processors. In one embodiment, the system is configured to ensure that the no substream is of too large a size to be stored substantially as a whole in a graphics processor's FIFO queue, which may be accomplished by determining whether the entire vertex stream is of too large a size, in which case that vertex stream will not be split at all, but will be streamed directly to one of the graphics processors.

The vertex stream may be of a mixed type, where some primitives are appropriate for splitting and others are not—e.g. polygons, triangle fans, and in general types that use a replace-middle algorithm or other replacement algorithm that is not replace-oldest. In this case, a portion of the vertex stream including primitives that are appropriate for splitting may be split, and other portions may be processed in an unsplit format.

Systems according to the invention may thus process graphics substreams in parallel to the extent possible, and load balance among the graphics processors, for efficient graphics processing and output.

DETAILED DESCRIPTION OF THE INVENTION

Hardware Suitable for Implementing Embodiments of the Invention.

Figure 1:
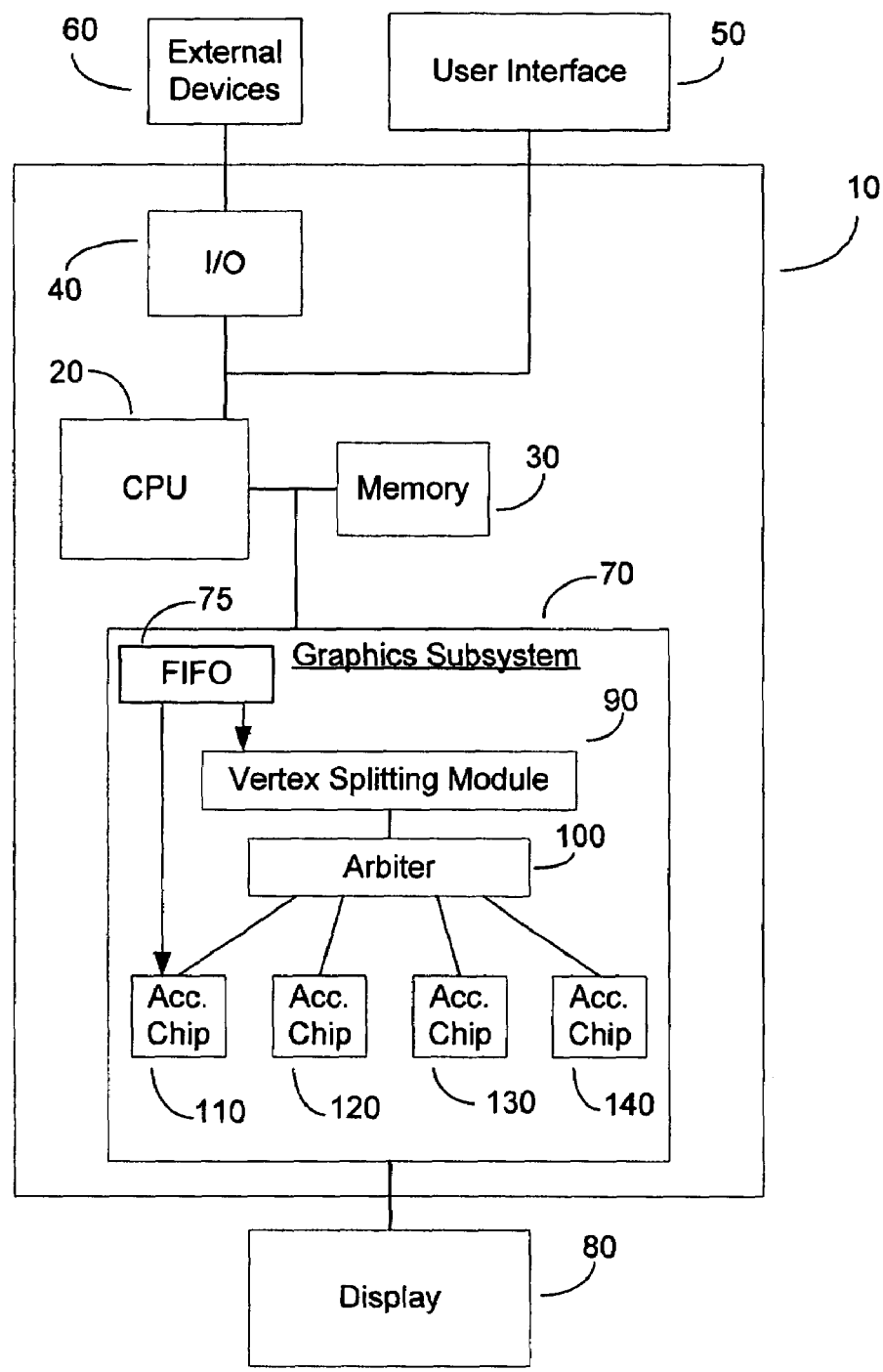
FIG. 1 is a block diagram illustrating a processor-based system incorporating an embodiment of the invention.

FIG. 1 is a block diagram of a processor-based system 10 implementing an embodiment of the invention. The system 10 may be a server, a workstation, a personal computer, or any other host or system that renders graphics data, including image data, video streams, or any other data suitable for display, printing or similar output.

The system 10 includes a microprocessor module or CPU 20, which includes at least one microprocessor operating in a conventional fashion and communicating with memory 30 and I/O (input-output) circuitry and/or logic 40. A user interface 50 coupled to the system 10 includes a mouse, display, printer, track ball, and/or other devices allowing a user to interact with the system 10.

The I/O circuitry may include conventional circuitry and/or logic to communicate with external devices 60, which may include storage devices, other workstations or servers, or any of a number of devices that can communicate over a network to the system 10 and exchange data with it. The connection to the external devices may be by any conventional network, fibre channel, wireless or other communication mechanism.

The processor-based system 10 includes a graphics subsystem with a vertex splitting module 90, an arbiter 100, hardware accelerator chips (or other graphics processing and/or rendering hardware) 110–140, and a display 80 and/or other suitable image output devices.

Control software or program modules may be stored in the memory 30, and are configured to control execution of operations by the processor 20 and the graphics subsystem 70, in particular the vertex splitting module 90 and the accelerators 110–140. Other logic may be included to carry out operations as described herein, and in general the term "logic" will be used to refer to hardware, software, firmware or some combination of these as configured to execute operations as described. Logic as defined in this way and control software or program steps or modules may be used in different implementations of the invention.

The system 10 may include a FIFO 75 coupled to both the vertex splitting module 90 and at least one of the accelerators, in this example accelerator 110. The FIFO 75 operates under control of a vertex decision (e.g. software or other logic) module that determines whether to send a vertex stream directly to the accelerator 110 or to the vertex splitting module 90, in a manner to be described below.

Figure 2:
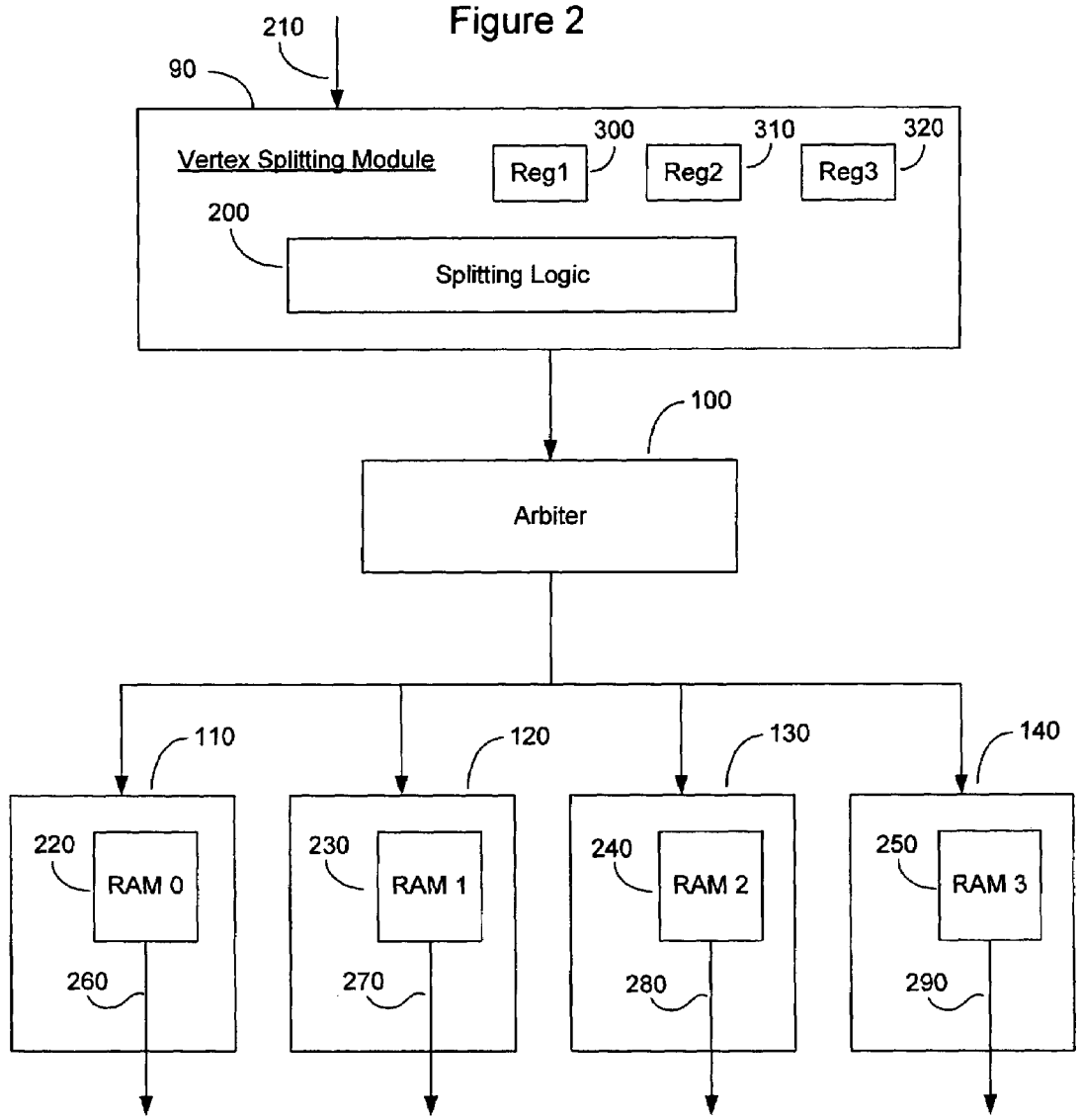
FIG. 2 is a block diagram of a vertex processing module according to an embodiment of the invention.

FIG. 2 shows details of an embodiment of the vertex splitting module 90 shown in FIG. 1. The vertex splitting module 90 includes splitting logic 200, which comprises logic (in the broad sense defined above) as needed to implement the features of the invention. The logic 200 receives a vertex stream via an input line (e.g. a serial line, a parallel cable, a bus, etc.) 210, and in a manner described below splits the vertex stream as needed to distribute it as smaller streams via the arbiter 100 to multiple FIFOs 220–250 of the accelerators 110–140. The FIFOs 220–250 may be RAMs or other FIFO implementations. The split vertex streams are then output over output lines 260–290 to the conventional graphics hardware for display on the display 80.

The vertex splitting module 90 includes state registers 300–320, used in a manner described below.

Data Structures and Fields.

Figure 3:
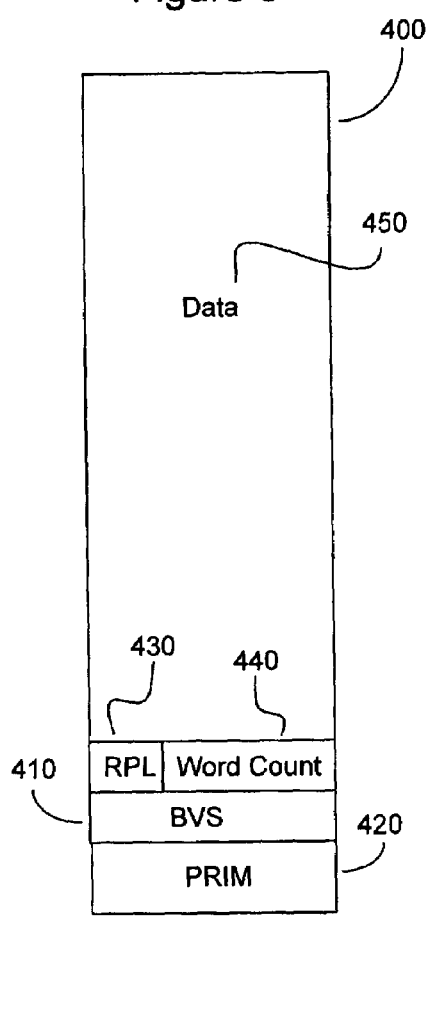
FIG. 3 represents a graphics data stream suitable for use in an embodiment of the invention.

FIG. 3 shows some elements of a conventional vertex stream 400, including a BVS ("begin vertex stream") header 410; a replacement code 430 indicating the type of replacement code algorithm (discussed below) that applies to the primitive type; a word count field 440 indicating the number of words in this vertex stream; and the data stream 450. In addition, a primitive type field 420 indicating a type of primitive in this vertex stream is sent, such as in advance of the vertex stream itself.

A unicast-unlocked vertex stream may be broken into individual subsets and formed into new, smaller vertex streams 500–520, as shown in FIG. 3. Each of the smaller vertex streams 500–520 will include the replacement code 430, a new BVS header (530-560-590), a new word count (540-570-600) and a new subset (550-580-610) of the original data stream, the subsets having a size to be determined in the course of the procedures described below. The primitive type information 420 is broadcast in this example to all of the accelerators that receive vertex substreams.

Other types of information streams used in graphics systems may include instruction streams, which are denoted by BIS (begin instruction stream) fields; register update information identified by a BRS (begin register stream) header; and compressed data denoted by a BCS (begin compressed stream) header. In the current embodiment of the invention, the vertex splitting module 90 effectively ignores these three types of streams, i.e. passes them through without splitting them.

Graphics Primitives.

Primitive graphics shapes are defined for use with OpenGL and other graphics standards. Examples of graphics primitives are shown in FIGS. 5A–5K. These primitives are as follows (with the OpenGL equivalent, if any, being given in parentheses):

TABLE 1

Graphics Primitives Types

Figure 5A:
FIGS. 5A–5K represent graphics primitives that may be rendered by a graphics subsystem.
Figure 5B:
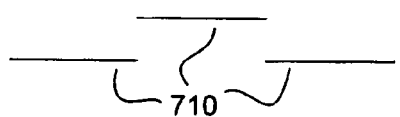
Figure 5C:
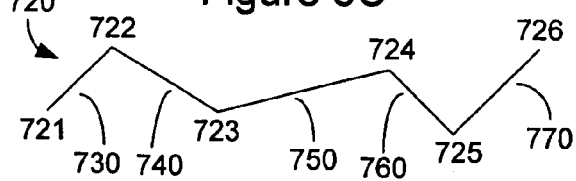
Figure 5D:
Figure 5E:
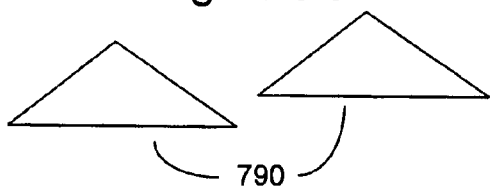
Figure 5F:
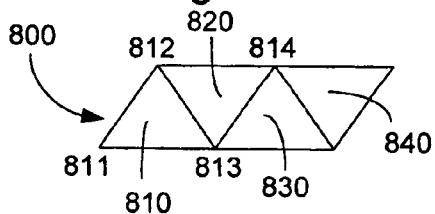
Figure 5G:
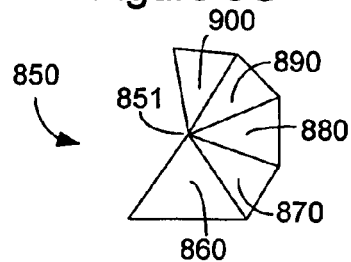
Figure 5H:
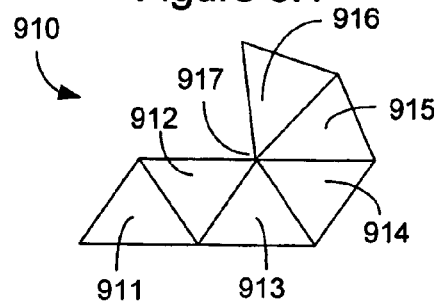
Figure 5I:
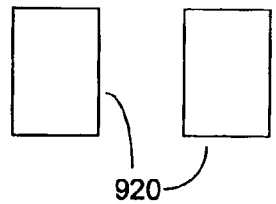
Figure 5J:
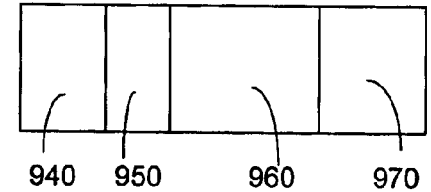
Figure 5K:

FIG. 5A individual dots or points 700 (GL_POINTS)
FIG. 5B isolated lines 710 (GL_LINES)
FIG. 5C line strip 720 (GL_LINE_STRIP)
FIG. 5D line loop 780
FIG. 5E isolated triangles 790 (GL_TRIANGLES)
FIG. 5F triangle strip 800 (GL_TRIANGLE_STRIP)
FIG. 5G triangle fan 850
FIG. 5H generalized triangle strip 910 (GL_TRIANGLE_LIST_SUN)
FIG. 5I isolated quads 920 (GL_QUAD)
FIG. 5J quad strip 930 (GL_QUAD_STRIP)
FIG. 5K polygon 980

When a vertex stream is sent to a graphics subsystem, it is useful to identify the type of graphics data primitives being sent. Thus, at the beginning of the vertex stream, an appropriate value is stored in the PRIM register 420 (see FIG. 3), corresponding to the primitive for that vertex stream. This primitive identifier is detected by the vertex splitting module 200 (which may include a processor or other logic to implement the function), and is stored in register 300, until the next primitive value is detected.

In addition, the vertex splitting module 200 determines the replacement code algorithm in RPL field 430 (FIG. 3) and the word count from field 440. Other values of use in the invention include: N_min, which is a minimum number of words that should be split from a vertex stream as a subset to send to an individual accelerator chip, and which is stored in register 310 as shown in FIG. 2; and the locked or unlocked status of the current vertex stream, stored in register 320. N_min and the locked status may be identified in headers of the vertex stream 400, or may (as with other status variables) be separately sent to the vertex splitting module 90 but correlated with the corresponding vertex streams.

Replacement Code Algorithms.

Each of the primitives in FIGS. 5A–5K has an associated replacement code algorithm, which as mentioned above is identified for each vertex stream in the RPL field 430. Alternatively or in addition, RPL codes can be stored with individual primitives or vertices.

The use of the replacement code algorithms can be carried out in a conventional manner in the setting of the present invention. An example of their use can be seen with reference to FIG. 5C, wherein the line strip 720 includes individual line segments 730–770 with vertices 721–726. To process segment 730, the graphics hardware (e.g. one of the accelerator chips 110–140 in FIG. 1) needs vertices 721 and 722; to process segment 740, it need vertices 722 and 723; etc. Thus, when the hardware receives vertex 721 and vertex 722 for segment 730, vertex 721 can be identified as the "oldest" vertex. When segment 740 is processed, in a "replace oldest" algorithm the vertex 721 is replaced by vertex 722 as the "oldest" vertex, and vertex 723 is added as a new vertex.

This procedure is carried out until the entire vertex stream has been processed. For some primitive types, additional vertex information may be added to the resultant split vertex streams.

Figure 4:
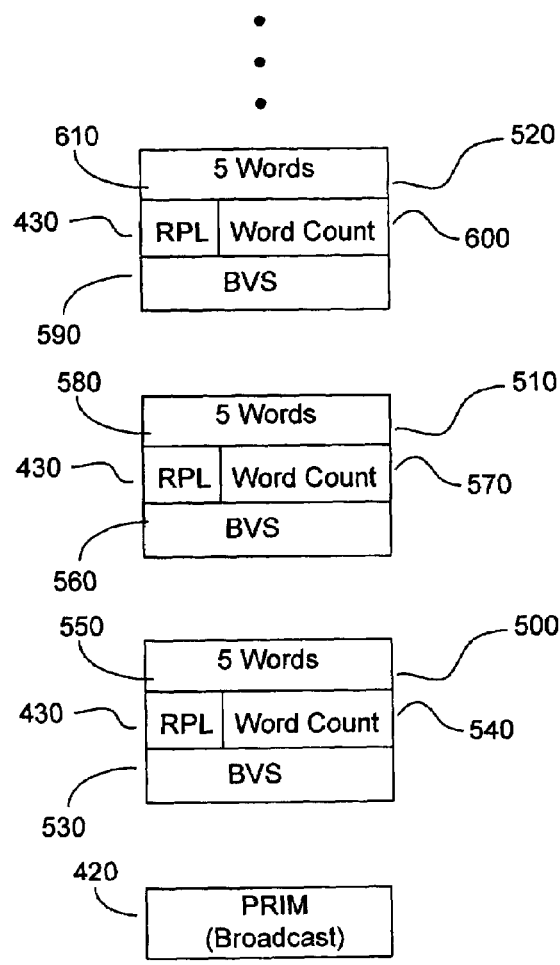
FIG. 4 represents a graphics data stream as in FIG. 3, after a vertex splitting procedure has been carried out.

Referring again to FIG. 3, if the vertex stream 400 includes vertices 721, 722, etc., then in FIG. 4 substream 500 may include vertices 721 and 722; substream 510 may include vertices 722 (which is the "oldest" in this substream) and 723; and substream 520 may include vertices 723 (the "oldest" for this substream) and 724.

A similar algorithm can be used for the triangle strip 800 shown in FIG. 5F, except that, after the first three vertices 811–813 (defining a first triangle 810) are processed, the most recent two vertices 812–813 are sent with the next vertex 814 to define the succeeding triangle 820. With this modification, the process is otherwise similar to the processing of the line strip 720.

Processing of a quad strip 930 (FIG. 5J) is similar, in that for each succeeding quad 950–970 after the first quad 940, two vertices must be saved (and the two oldest replaced) for processing the next quad.

Processing of isolated structures such as dots 700 (FIG. 5A), line segments 710 (FIG. 5B), triangles 790 (FIG. 5E) and quads 920 (FIG. 5I) is simpler, in that all the vertices are replaced for each new structure, since none of the vertices are common to multiple structures.

However, for a triangle fan 850 (FIG. 5G) or the triangle fan portion 912–916 of a generalized triangle strip 910 (FIG. 5H), a "replace middle" algorithm is used, i.e. in these cases a middle vertex (851 or 917) is retained for each succeeding triangle in the triangle fan (860–900 or 912–916). The processing of such structures is somewhat more involved in the setting of a procedure for splitting up a vertex stream into substreams for parallel processing, requiring retention of the middle vertices for a potentially lengthy amount of time in a system having multiple graphics accelerators or processors.

FIGS. 5D (open loop 780) and 5K (polygon 980) also involve more complicated processing, especially in the setting of splitting up the vertex streams. In one embodiment of the present invention, only vertex streams with isolated structures (FIGS. 5A, 5B, 5E, 5I) or whose replacement algorithms are replace-oldest (FIGS. 5C, 5F, 5J) are processed as described herein.

Figure 6:
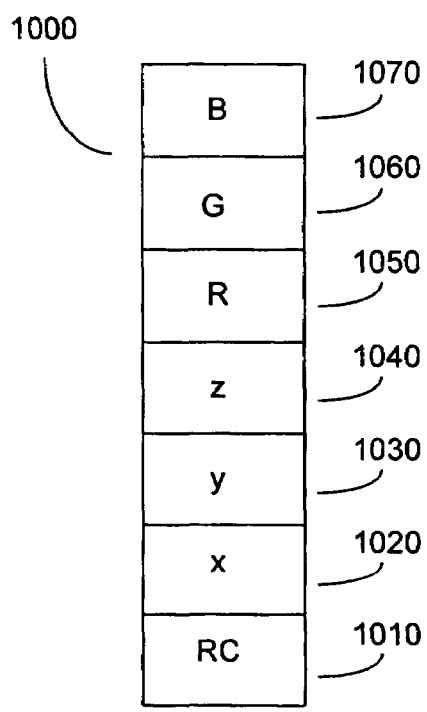
FIG. 6 illustrates a data structure for a single vertex in a graphics data stream.
Figure 7:
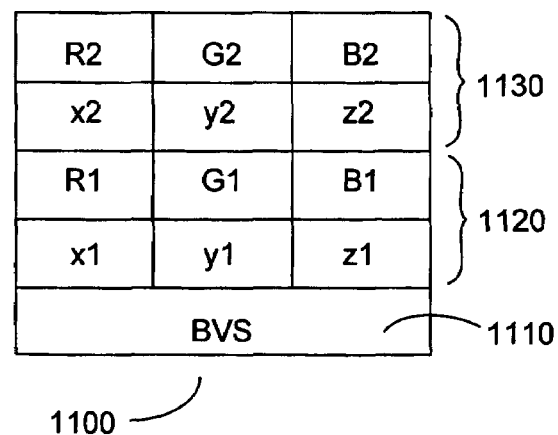
FIG. 7 represents a graphics data stream including data for multiple vertices.

As shown in FIG. 6, a data structure for a given vertex in general may include fields for the replacement code (1010), coordinates (1020–1040), color (here, RGB data 1050–1070), and other conventional vertex data (not separately shown). A vertex stream 1100 (FIG. 7) will include the begin vertex stream header 1110 and data 1120, 1130, etc. for the multiple vertices in the vertex stream.

Splitting a Single Vertex Stream into Multiple Streams for Distribute Processing.

Figure 8:
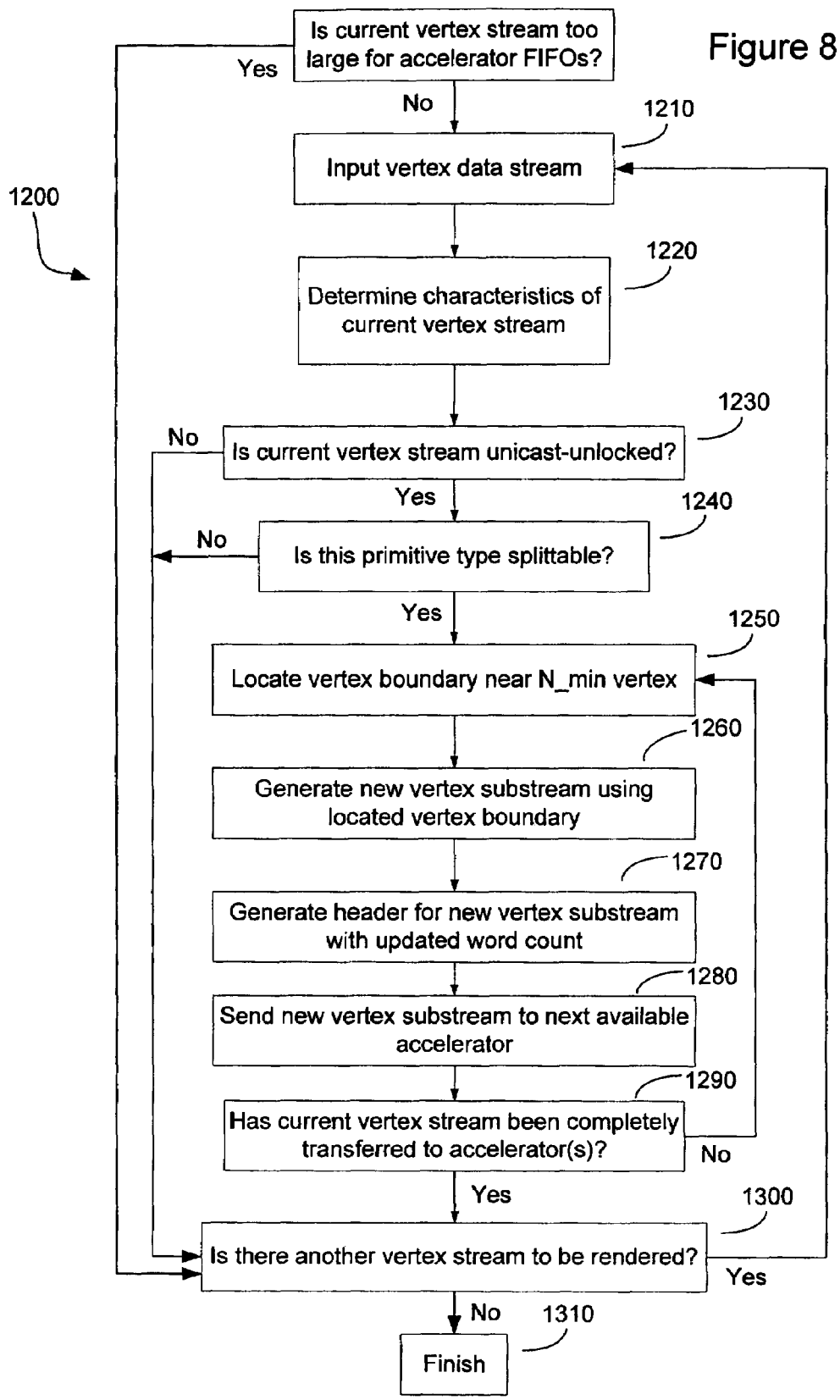
FIG. 8 is a flow chart representing a method according to one embodiment of the invention.

Referring now to FIGS. 1, 2 and 8, when a new vertex stream arrives at the graphics subsystem 70 (see FIG. 1), it is sent to the FIFO 75, and in one embodiment, it is first determined whether the vertex stream is too large to fit into the output FIFO (not separately shown) of the accelerator chip 110. In this embodiment, the FIFOs of the accelerator chips 110–140 may be of substantially the same size. If it is determined (from the word count) that the current vertex stream would not fit in its entirety into the FIFO of the accelerator chip 110, then the vertex stream will not be split, and it is sent directly from the FIFO 75 to the chip 110 (or any desired chip or chips). This is because it cannot be determined in advance (i.e. without inspecting the vertex stream itself) whether it will be possible to split it at a point such that the resulting substream will each be small enough to fit entirely into a FIFO of one of the accelerator chips, and for this embodiment that is a desired goal, to facilitate the parallel processing of the substreams.

In another embodiment, a given vertex stream may be provided with a header value representing the largest substream that would result if it were split according to the invention. Such a value could be generated, e.g., by preprocessing substantially in real time as the vertex stream is generated. In this embodiment, the FIFO 75 and associated logic can determine whether this value is no larger than the FIFO size of the accelerator chips. If so, then that vertex stream can be sent to the vertex splitting unit, since it is known that the substreams will fit into the accelerator chip FIFOs.

For vertex streams sent to the vertex splitting module 90, the module 90 determines the relevant characteristics of the stream, such as the primitive type, the replacement code and the word count (step 1220 of FIG. 8). If the vertex stream is unicast-unlocked (step 1230), the method proceeds to step 1240; otherwise, the method proceeds to step 1300 to determine if there is another vertex stream to be processed. That is, if the vertex stream is not unicast-unlocked (e.g. it is multicast or unicast-locked), it is not split by this embodiment of the method.

At step 1240, if the primitive type is identified as splittable (as discussed above), the method proceeds to step 1250, and otherwise to step 1300. Thus, in the present embodiment, only those primitives shown in FIGS. 5A–5C, 5E–5F and 5I–5J are split. Triangle strip portions of a generalized triangle strip may also be split (see Figure H), but in the present embodiment the triangle fan portions of generalized triangle strips would not be split. In general, this embodiment will split vertex streams only for primitives that are either isolated structures and/or use a replace-oldest algorithm, as determined from the replacement code field of either the entire vertex stream, a substream generated from a vertex stream, or an individual vertex.

At step 1250, the vertex splitting module locates a vertex near a count N_min from the current location in the current vertex stream. (On the first pass, the "current location" will be the beginning of the first vertex stream.) The value N_min represents a number of data words, predetermined by a user (or determined automatically by the system) as being large enough to substantially fill but not overflow one of the FIFOs 220–250 (see FIG. 2). Thus, the module 90 locates a vertex boundary in the vertex stream where the total word count is near N_min. In one embodiment, this vertex boundary may be selected to be at least as large as N_min, and in another, it may be selected to be at most N_min—or within some predetermined range (number of words) from N_min—to ensure that the resulting substream will not be too large for a FIFO.

At step 1260, a new (sub-)stream is generated from the original vertex stream, including a number of words as determined by the location of the vertex boundary in step 1250. For instance, if N_min was set to five words and a vertex boundary was located exactly five words from the beginning of the vertex stream, then a new substream 500 (see FIG. 4, beginning with BRS 425) would be generated with a new BVS header 530 (see step 1270 in FIG. 8), a new word count 540, and the five words of data 550, along with the replacement code 430. The value for N_min may, of course, be quite large, limited only as desired by the user.

At step 1280, this new vertex stream (e.g. 500) is sent to the next available graphics processor or accelerator, e.g. accelerator 110 in FIG. 1, and at step 1290 it is determined whether there are additional vertices to be processed in the current vertex stream.

If so, then the method proceeds to step 1250, where a new vertex boundary is located at a distance approximately N_min from the current location in the vertex stream. In the example of FIG. 4, this would be another five words downstream, i.e. a total of ten vertices from the beginning of the vertex stream. The procedure is reiterated until at step 1290 it is determined that the entire vertex stream has been processed.

At step 1300, if another vertex stream is to be rendered, the method proceeds back to step 1210, and otherwise stops.

Using this method, a very large vertex stream of a unicast-unlocked, splittable type will be split up into multiple substreams and processed in parallel by the graphics hardware such as accelerators 110–140. This can be done automatically for all such eligible vertex streams, and/or it may be governed by a load-balancing or other procedure that determines whether to split a vertex stream and if so, to which accelerators the substreams should be sent.

What is claimed is:

1. A graphics system, comprising:
    a vertex splitting module operable to:
        receive a vertex stream relating to graphics data, wherein the vertex stream comprises a primitive identifier corresponding to the primitive type in the vertex stream, a replacement code corresponding to the replacement algorithm used for the primitive type in the vertex stream, and vertex data for each vertex of the primitives;
        detect and store the primitive identifier and the replacement code; and
        conditionally generate at least two substreams from the vertex stream by splitting the vertex stream into sequential segments, if the primitive identifier indicates a primitive type of one or more isolated structures, and the replacement code indicates a replace-oldest replacement algorithm; and
    at least two graphics processors configured to operate in parallel and independently process substreams received from the vertex splitting module into pixels.

2. The graphics system of claim 1, wherein the vertex splitting module conditionally generates at least two substreams if the vertex stream is of a predesignated type.

3. The graphics system of claim 2, wherein the predesignated type comprises a unicast vertex stream or an unlocked vertex stream.

4. The graphics system of claim 1, wherein the vertex splitting module is configured to broadcast a primitive type relating to the vertex stream to each of the graphics processors.

5. The graphics system of claim 1, wherein each substream includes at least two vertices.

6. The graphics system of claim 1, wherein consecutive substreams are configured to share at least one vertex in common.

7. The graphics system of claim 6, wherein the vertex splitting module is configured to generate the substreams in a replace oldest vertex format.

8. A method comprising:
    receiving a vertex stream representing graphics data, wherein the vertex stream comprises a primitive identifier corresponding to the primitive type in the vertex stream, a replacement code corresponding to the replacement algorithm used for the primitive type in the vertex stream, and vertex data for each vertex of the primitives;
    detecting and storing the primitive identifier and the replacement code;
    if the primitive identifier indicates a primitive type of one or more isolated structures, and the replacement code indicates a replace-oldest replacement algorithm; then
    locating a vertex boundary removed from a current vertex location;
    generating a new vertex substream from the vertex stream by splitting the vertex stream into sequential segments using the located vertex boundary; and
    transmitting the vertex substream to one of two or more parallel graphics processors to render the vertex substream to pixels.

9. The method of claim 8, further comprising repeating the locating, generating and transmitting steps until the entire vertex stream has been split into substreams and transmitted to the graphics processors.

10. The method of claim 8, wherein:
    the generating step further comprises generating a plurality of vertex substreams from the vertex stream; and
    the transmitting step further comprises transmitting the plurality of vertex substreams to the processors in a load-balanced distribution.

11. The method of claim 8, further comprising determining whether the vertex stream is of a type predesignated to be split.

12. The method of claim 11, wherein the predesignated vertex stream type is a unicast type.

13. The method of claim 11, wherein the predesignated vertex stream type is an unlocked type.

14. The method of claim 8, wherein at least one of the graphics processors includes a data queue, and wherein the method further comprises:
    determining whether the vertex stream is of a size that can be stored in the data queue, and if not, then
    transmitting the vertex stream to a graphics processor in an unsplit format.

15. The method of claim 8, wherein the generating step comprises generating a plurality of vertex substreams from the vertex stream, and generating a new word count for each of the plurality of vertex sub streams.

16. The method of claim 8, wherein the generating step comprises generating a plurality of vertex substreams from the vertex stream, and broadcasting a primitive type relating to the vertex stream to at least a subset of the graphics processors.

* * * * *